US009485246B2

(12) United States Patent
Vepsäläinen et al.

(10) Patent No.: US 9,485,246 B2
(45) Date of Patent: Nov. 1, 2016

(54) DISTRIBUTED AUTHENTICATION WITH DATA CLOUD

(75) Inventors: Ari Vepsäläinen, Espoo (FI); Tapani Lumme, Helsinki (FI); Jussi Mäki, Espoo (FI)

(73) Assignee: Nokia Technologies Oy, Espoo (FI)

( * ) Notice: Subject to any disclaimer, the term of this patent is extended or adjusted under 35 U.S.C. 154(b) by 108 days.

(21) Appl. No.: 13/519,438

(22) PCT Filed: Dec. 21, 2010

(86) PCT No.: PCT/FI2010/051066
§ 371 (c)(1),
(2), (4) Date: Sep. 11, 2012

(87) PCT Pub. No.: WO2011/080389
PCT Pub. Date: Jul. 7, 2011

(65) Prior Publication Data
US 2013/0019299 A1    Jan. 17, 2013

Related U.S. Application Data

(60) Provisional application No. 61/290,729, filed on Dec. 29, 2009.

(51) Int. Cl.
*H04L 29/06* (2006.01)
*H04L 9/32* (2006.01)

(52) U.S. Cl.
CPC ......... *H04L 63/0815* (2013.01); *H04L 9/3228* (2013.01); *H04L 9/3236* (2013.01); *H04L 63/08* (2013.01); *H04L 63/10* (2013.01); *H04L 63/123* (2013.01)

(58) Field of Classification Search
CPC .... H04L 63/08; H04L 63/0815; H04L 63/10
USPC ............................................................ 726/8
See application file for complete search history.

(56) References Cited

U.S. PATENT DOCUMENTS 6,928,463 B1 *  8/2005  Tene ................... H04L 12/2856
                                                370/356
7,191,467 B1 *  3/2007  Dujari ..................... H04L 63/08
                                                709/220

(Continued)

OTHER PUBLICATIONS

OAuth Core 1.0 Revision A; Jun. 24, 2009; Mark Atwood et al.; retrieved from oauth.net/core/1.0a/ on May 4, 2014.*

(Continued)

*Primary Examiner* — James Turchen
(74) *Attorney, Agent, or Firm* — Harrington & Smith

(57) ABSTRACT

A method includes, in response to a need to access for a user certain stored data that requires authentication, sending a request for the stored data into a data cloud, the request not identifying the user. The method further includes receiving, from the data cloud, response information descriptive of an authentication realm and a single-use nonce; presenting the information descriptive of the authentication realm to the user and prompting the user for a user name and password; re-sending the request into the data cloud with an authentication header having user credentials generated at least in part using the response information, the user credentials comprising the user name and a hashed password; and if the user credentials are valid, receiving from the data cloud the requested stored data.

19 Claims, 2 Drawing Sheets

(56) References Cited

U.S. PATENT DOCUMENTS

| | | | | |
|---|---|---|---|---|
| 7,472,213 | B2* | 12/2008 | Fukuyama | G06F 13/161 710/241 |
| 7,475,241 | B2* | 1/2009 | Patel | H04L 63/068 713/155 |
| 7,783,666 | B1* | 8/2010 | Zhuge | G06F 17/30082 707/783 |
| 7,818,342 | B2* | 10/2010 | Stuhec | G06F 17/30569 707/777 |
| 7,945,774 | B2* | 5/2011 | Ganesan | H04L 63/06 713/151 |
| 8,208,614 | B2* | 6/2012 | Suzuki | G06F 21/31 379/112.01 |
| 8,364,969 | B2* | 1/2013 | King | G06F 21/6254 713/182 |
| 8,452,881 | B2* | 5/2013 | Boubez | H04L 63/08 709/222 |
| 2003/0069854 | A1* | 4/2003 | Hsu | G06Q 30/02 705/59 |
| 2008/0066168 | A1* | 3/2008 | Gregg | G06F 21/335 726/7 |
| 2008/0077638 | A1 | 3/2008 | Monk et al. | |
| 2008/0080526 | A1 | 4/2008 | Gounares et al. | |
| 2008/0313721 | A1 | 12/2008 | Corella | |
| 2009/0088142 | A1 | 4/2009 | Baribault et al. | |
| 2009/0178109 | A1 | 7/2009 | Nice et al. | |
| 2009/0271847 | A1* | 10/2009 | Karjala | H04L 63/0807 726/6 |
| 2009/0300364 | A1 | 12/2009 | Schneider | |
| 2009/0328081 | A1* | 12/2009 | Bille | H04L 63/10 719/330 |
| 2010/0210240 | A1* | 8/2010 | Mahaffey | H04L 41/0253 455/411 |
| 2010/0319059 | A1* | 12/2010 | Agarwal | H04L 9/321 726/7 |
| 2010/0332832 | A1* | 12/2010 | Wu | H04L 9/0866 713/169 |
| 2011/0265156 | A1* | 10/2011 | Bombay | G06F 21/34 726/5 |

OTHER PUBLICATIONS

OAuth Core 1.0; Mark Atwood et al.; http://oauth.net/core/1.0/#auth_step1 ; Dec. 4, 2007.*

Kaliski, "PKCS #5: Password-Based Cryptography Specification", Network Working Group, RFC 2898, v 2.0, Sep. 2000, pp. 1-34.

Franks et al., "HTTP Authentication: Basic and Digest Access Authentication", Network Working Group, RFC 2617, Jun. 1999, pp. 1-32.

Zhang et al., "Securing Elastic Applications on Mobile Devices for Cloud Computing", In Proceedings of ACM Cloud Computing Security Workshop, Nov. 13, 2009, pp. 127-134.

Chu et al., "Open Grid Protocol: Service Establishment", Internet Engineering Task Force, Internet-Draft, Jul. 12, 2009, pp. 1-21.

Abiona et al., "Mobile Agent Based Authentication for Wireless Network Security", International Wireless Communications and Mobile Computing Conference, Aug. 6-8, 2008, pp. 1075-1080.

Funk et al., "EAP Tunneled TLS Authentication Protocol Version 1", EAP, Internet-Draft, Standards Track, Mar. 2006, pp. 1-22.

International Search Report and Written Opinion received for corresponding International Patent Application No. PCT/FI2010/051066, dated May 13, 2011, 12 pages.

* cited by examiner

DISTRIBUTED AUTHENTICATION WITH DATA CLOUD

RELATED APPLICATION

This application was originally filed as PCT Application No. PCT/FI2010/051066 filed Dec. 21, 2010, which claims priority benefit to U.S. Provisional Patent Application No. 61/290,729, filed Dec. 29, 2009.

TECHNICAL FIELD

The exemplary embodiments of this invention relate generally to user data storage and retrieval methods, apparatus and computer programs and, more specifically, relate to user authentication methods, apparatus and computer programs when accessing stored data.

BACKGROUND

The following abbreviations that may be found in the specification and/or the drawing figures are defined as follows:
 API application program interface
 CDN content delivery/distribution network
 HA home agent
 HTTP hypertext transfer protocol (RFC 2616)
 RDF resource description framework
 SSL secure sockets layer
 SSO single sign on
 TLS transparent layer security (RFC 5246)
 QUID universally unique identifier (RFC 4122)

A protocol known as OAuth (http//oauth.net) enables websites or applications (consumers) to access protected resources from a web service (service provider) via an API, without requiring users to disclose their service provider credentials to the consumers. In general, OAuth creates a freely-implementable and generic methodology for API authentication.

The RDF data model (www.w3.org/RDF) is based upon making statements about resources (in particular Web resources) in the form of subject-predicate-object expressions, referred to as "triples". The subject denotes the resource, while the predicate denotes traits or aspects of the resource and expresses a relationship between the subject and the object.

A "cloud" may be considered to refer to a collection of resources (e.g., hardware resources and/or software resources) that are provided and maintained, relative to a particular user, by one or more third parties. The collection of resources is accessible by the particular user over a data communications network. The data communications network can be a wireline network and/or a wireless network, and may embody the Internet and/or a local area network (LAN). The resources can provide services to the user, such as data storage services, word processing services, and other types of services and/or applications that are conventionally associated with person computers and/or local servers.

Some representative US Published Patent Applications that relate to clouds include: US 2008/0077638 A1, "Distributed Storage in a Computing Environment", Monk et al.; US 2008/0080526 A1, "Migrating Data to New Cloud", Gounares et al.; and US 2009/0088142 A1, "Device Migration", Baribault et al.

For a case where the cloud provides distributed data storage for a user it may be referred to as a "data cloud".

A problem that arises in such a scenario is how to best provide security and privacy for a particular user's data in the data cloud so as to, for example, prevent unauthorized access to the user's data.

SUMMARY

The foregoing and other problems are overcome, and other advantages are realized, in accordance with the presently preferred embodiments of this invention.

In accordance with a first aspect of the exemplary embodiments a method comprises, in response to a need to access for a user certain stored data that requires authentication, sending a request for the stored data into a data cloud, the request not identifying the user; receiving, from the data cloud, response information descriptive of an authentication realm and a single-use nonce; presenting the information descriptive of the authentication realm to the user and prompting the user for a user name and password; re-sending the request into the data cloud with an authentication header having user credentials generated at least in part using the response information, the user credentials comprising the user name and a hashed password; and if the user credentials are valid, receiving from the data cloud the requested stored data.

In accordance with a further aspect of the exemplary embodiments an apparatus comprises a processor and a memory including computer program code. The memory and computer program code are configured to, with the processor, cause the apparatus at least to perform, in response to a need to access for a user certain stored data that requires authentication, sending a request for the stored data into a data cloud, the request not identifying the user; receiving, from the data cloud, response information descriptive of an authentication realm and a single-use nonce; presenting the information descriptive of the authentication realm to the user and prompting the user for a user name and password; re-sending the request into the data cloud with an authentication header having user credentials generated at least in part using the response information, the user credentials comprising the user name and a hashed password and, if the user credentials are valid, receiving from the data cloud the requested stored data.

BRIEF DESCRIPTION OF THE DRAWINGS

The foregoing and other aspects of the presently preferred embodiments of this invention are made more evident in the following Detailed Description of the Preferred Embodiments, when read in conjunction with the attached Drawing Figures, wherein.

DETAILED DESCRIPTION

Figure 1:
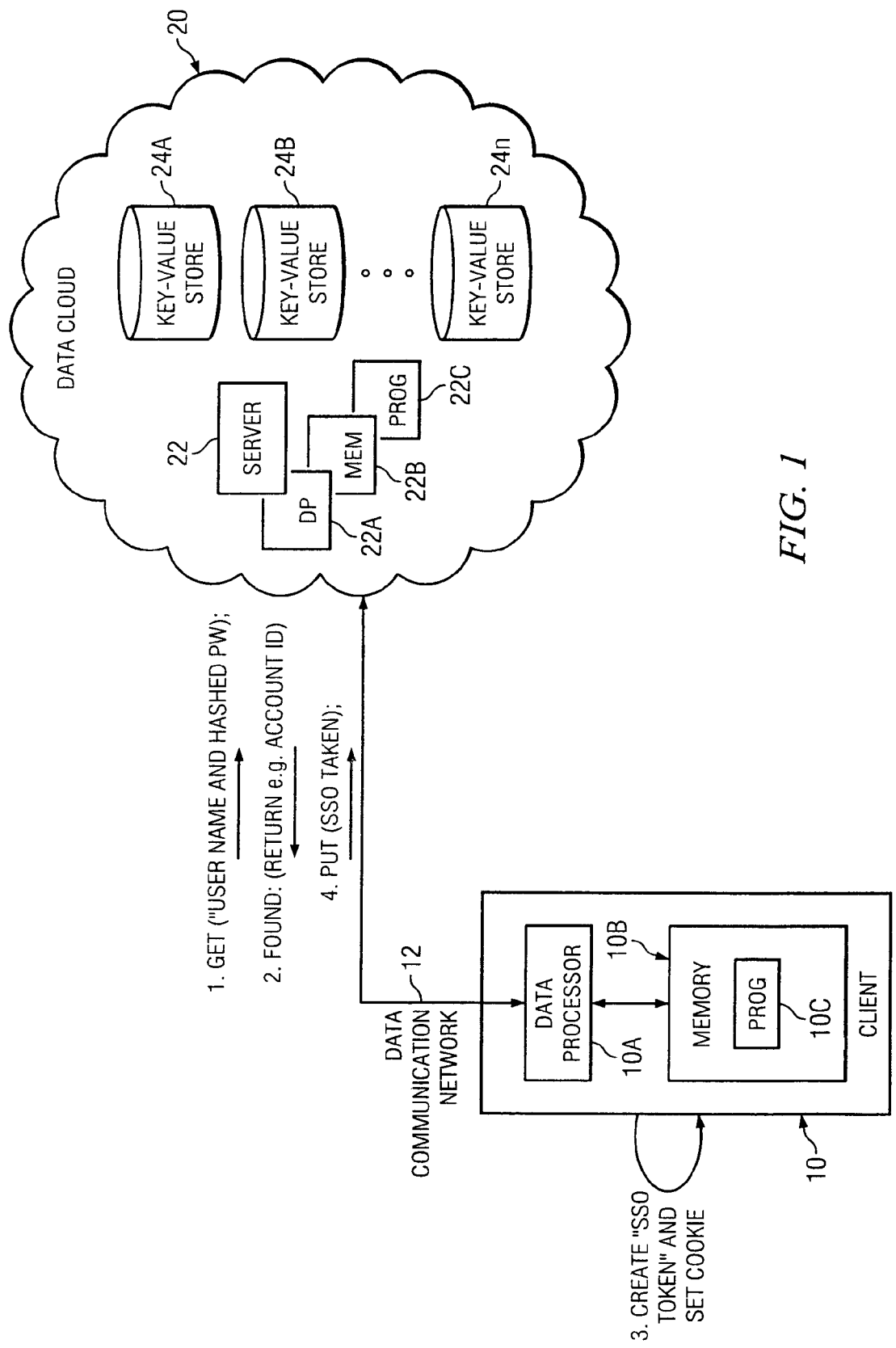
FIG. 1 is a simplified block diagram that illustrates a client and a data cloud, as well as message flow between the server and the data cloud in accordance with the exemplary embodiments of this invention.

FIG. 1 is a simplified block diagram that illustrates a client 10 and a data cloud 20, as well as message flow between the client 10 and the data cloud 20 in accordance with the exemplary embodiments of this invention. The client 10, which may be or include, for example, a browser and/or user agent, includes or is hosted by at least one data processor 10A and at least one computer-readable medium such as a memory 10B. The memory 10B is assumed to include a program (PROG) 10C containing computer software instructions that when executed cause the client 10 to operate in accordance with the exemplary embodiments of this invention. A wired and/or wireless data communications network 12 bi-directionally connects the client 10 to the data cloud 20, and more specifically to at least one server 22 that may also be assumed to include at least one data processor (DP) 22A and at least one computer-readable medium such as a memory 22B. The memory 22B is assumed to include a program (PROG) 22C containing computer software instructions that when executed cause the server 22 10 to operate in accordance with the exemplary embodiments of this invention. The data cloud 20 also includes a plurality of data storage devices or systems or stores 24 (24A, 24B, . . . , $24_n$) storing key-value pairs (credentials) and other data. The stores 24 may be based on any suitable type of data storage technology including, but not limited to, fixed and removable storage medium, rotating disks using magnetic or optical data storage read and write capability, as well as semiconductor memory.

The client 10 can be embodied in, as exemplary and non-limiting embodiments, a PC, a workstation, a mobile device such as a laptop or notebook computer, or a wireless communication device such as a cellular phone, personal digital assistant, an Internet appliance, or any suitable type of user device that enables connectivity to the Internet and/or the data cloud 20. The data stores 24 may be based on any suitable type of data storage technology including, but not limited to, fixed and removable storage medium, rotating disks using magnetic or optical data storage read and write capability as well as semiconductor memory.

For the purposes of describing the exemplary embodiments of this invention it can be assumed that the data in the data cloud 20 is available for authorized services and applications, and the data cloud 20 controls access to data, e.g., to the credentials. The stored data is assumed to be distributed geographically and to be accessible from anywhere. The data cloud 20 can be open in the Internet.

A typical login scenario includes the following steps.

The client 10 requests a page (of data) from the server 22 that requires authentication, but does not provide a user name and password. The server 22 responds with a (HTTP) response code (e.g., a "401" response code), providing an authentication realm and a randomly-generated, single-use value referred to as a nonce. The client 10 presents the authentication realm (typically a computer or system being accessed) to a user and prompts the user for a user name and password. Once a user name and password have been supplied, the client 10 re-sends the same request, but adds an authentication header that includes the response code with the user name and (typically) a hashed password. The server 22 checks the credentials and returns the page requested. If the user name is invalid and/or the password is incorrect, the server returns an error response (e.g. "401").

It can be noted in this regard that it may be problematic if the key has to be static without hashing the password with a nonce. This could be avoided using at least two mechanism, either use Public key encryption or use dynamic hashes. If the PKI is used then the server 22 "read handler" in the authentication cloud 20 would use the Public Key algorithm to provide the password security between the client 10 and the server 22. Alternatively, one may use challenge response hashes which could be dynamically provided in a manner similar to certain digest-based authentications (e.g., RFC 2617, HTTP Authentication: Basic and Digest Access Authentication, Franks et al., June 1999).

In the exemplary embodiments of this invention the user credentials (e.g., the user name and hashed password) are stored in the data cloud 20. Authorization to the credentials is based on, for example, one of an OAuth key and secret or on SSL/TLS. The data may be stored as a <key, value> pair, where the key is, for example, a combination of username and hashed password, and the value is, for example, information on how many times the data has been accessed during some interval of time (e.g., during the last minute). For security reasons the data cloud 20 may restrict, for example, the number of times any application can access certain credentials.

The user credentials may have the form: <"username"+ hashed password, accountid>.

The key contains the credentials as a unique item. In general, the credentials may contain any information, such as the user's full name, account identification, mobile telephone number and so forth. Considered in the context of the RDF ontology the key (credentials) defines the subject, and the value the object. A key may have an expiration time as provenance data, and may be salted.

As is known, in cryptography a salt comprises random bits that are used as one of the inputs to a key derivation function. The other input is typically a password or passphrase. The output of the key derivation function is stored as the encrypted version of the password. A salt can also be used as a part of a key in a cipher or other cryptographic algorithm. The key derivation function typically uses a cryptographic hash function. SSL is one scheme that uses salts. More preferably, reference can be made to RFC 2898, PKCS #5: Password-Based Cryptography Specification, Version 2.0, B. Kaliski, September 2000.

The data stored in the data cloud 20 is visible to all applications, services and the like worldwide (if the user/ service has proper access rights to the data).

Client code (e.g., JavaScript) can be shared by several applications, client components, services and the like. Client code can have a secure access to credentials stored in the data cloud 20. However, to extract information from the data cloud 20 the client 10 must be able to provide a key matching the keys stored in data cloud 20.

During use, an authentication program run at the client 10, part of the program 22C, may display a login screen and prompt the user to enter credentials. After the user has entered the credentials the authentication program checks to determine if the credentials are valid by accessing data cloud with a proper key (e.g., the authentication program sends a Get ("user name"+hashed password)). This is shown in FIG. 1 as the Operation 1. If the key is valid the server 22 returns, for example, an accountid associated with the user. This is shown in FIG. 1 as the Operation 2. Assuming that the key is valid, a cookie (e.g., SSO token/UUID) is created by the client 10, e.g., by a client application or service. This is shown in FIG. 1 as the Operation 3. The SSO token is then stored into the data cloud 20 using, for example, a Put (SSO token) message, shown as Operation 4 in FIG. 1.

The cookie (containing the SSO token) that is created has a limited lifetime, and may be available only for one browsing session.

If the user, after having received the SSO token, accesses a service that is a member of the same authentication configuration, and if the browsing session has not been terminated or expired, then the user is automatically authenticated and is not challenged for user name and password.

As was noted above the data is stored as <key, value> pairs. The key may be of the form:

Key="user name"+"password hash", where the user name can also be hashed.

Certain (optional) additional information, e.g., nonce, organization, etc., can be added into the key to limit the access to the data.

In accordance with the exemplary embodiments of this invention authentication and token management are totally distributed to applications, clients and trusted services. A HA is only dependent on network capability and data cloud 20 caching. The credential keys can be cached and distributed into, for example, the CDN.

Further, it should be appreciated that no specific SSO server setup is needed. In practice the SSO setup is simple to accomplish and, in principle, the user profile and registration could also be distributed to client applications.

In addition, overall security concerns are not greater than those of typical authentication flow, as the amount of effort needed to guess a proper key for the credential store (key-value store 24) is at least as great as would be needed to guess a proper username with a proper password hash.

The use of these exemplary embodiments assumes the presence of a key management system (e.g., to manage OAuth keys and secrets), although such a system would be present in any case.

In general, tokens may have at least the same complexity as UUIDs. The probability that two or more tokens would have the same signature is small, and when combined with, for example, an application key the probability of a collision occurring is negligible.

Figure 2:
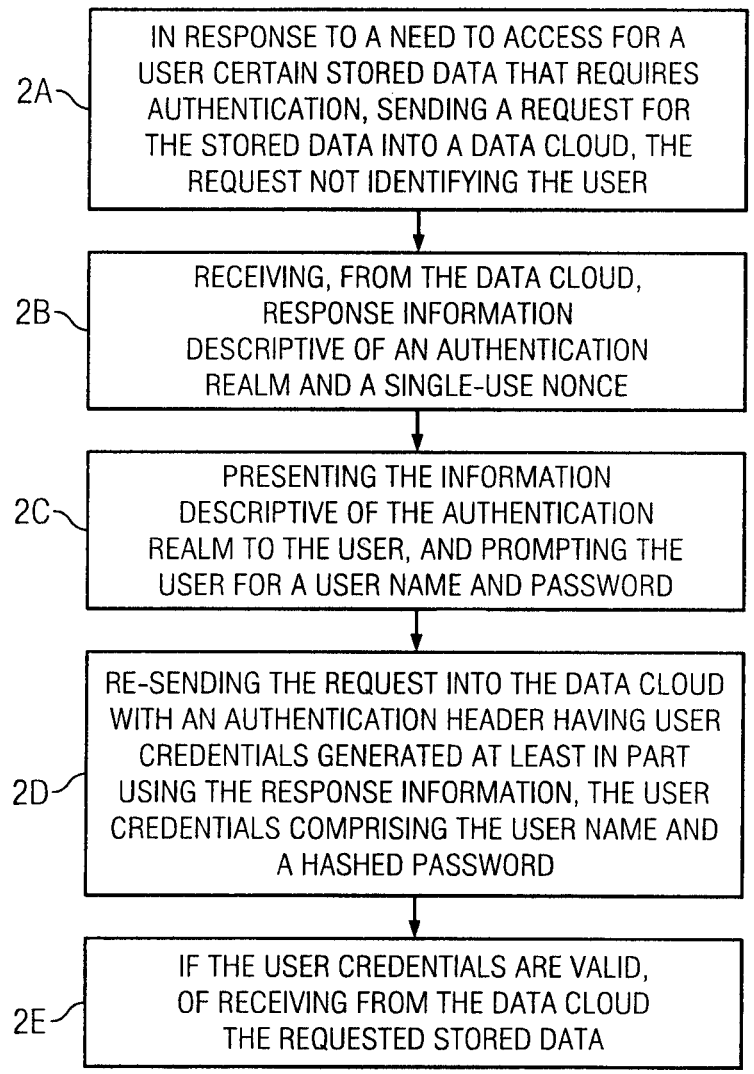
FIG. 2 is a logic flow diagram that illustrates the operation of a method, and a result of execution of computer program instructions embodied on a computer readable memory, in accordance with the exemplary embodiments of this invention.

FIG. 2 is a logic flow diagram that illustrates the operation of a method, and a result of execution of computer program instructions, in accordance with the exemplary embodiments of this invention. In accordance with these exemplary embodiments a method performs, at Block 2A, a step performed in response to a need to access for a user certain stored data that requires authentication, sending a request for the stored data into a data cloud, the request not identifying the user. At Block 2B there is a step of receiving, from the data cloud, response information descriptive of an authentication realm and a single-use nonce. At Block 2C there is a step of presenting the information descriptive of the authentication realm to a user, and prompting the user for a user name and password. At Block 2D there is a step of re-sending the request into the data cloud with an authentication header having user credentials generated at least in part using the response information, the user credentials comprising the user name and a hashed password. At Block 2E there is a step that is executed, if the user credentials are valid, of receiving from the data cloud the requested stored data.

The various blocks shown in FIG. 2 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g., "key", "token", "cookie", etc.) are not intended to be limiting in any respect, as these parameters may be identified by any suitable names. Further, the various names assigned to different functions (e.g., UUID, SSO, SSL, TLS, etc.) are not intended to be limiting in any respect, as these various functions may be identified by any suitable names, and may also in some cases be replaced by different functions providing the same or similar functionality.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
  sending a client request for stored data into a data cloud in response to a need to access for a user certain stored data that requires authentication to gain access thereto, where the client request does not provide a user name and password such that the client request does not identify the user, said data cloud being a collection of resources maintained to provide geographically distributed data storage for the data;

receiving, from the data cloud, response information including at least an authentication realm, wherein the authentication realm corresponds to said geographically distributed data storage, and wherein the response information includes information identifying an authentication computer or system in the data cloud to be accessed for authentication with the authentication realm;

presenting the response information of the authentication realm to the user and prompting the user for a user name and password; and re-sending the same client request into the data cloud with an authentication header having user credentials generated at least in part using the response information, the user credentials comprising the user name and a hashed password, the hashed password formed using a function included with the response information, wherein the user credentials are stored in the data cloud as a <key, value> pair allowing multiple authorized user applications access to the user credentials, and wherein the key comprises a combination of the user name and the hashed password and the value comprises information descriptive of how many times the data has been accessed during some interval of time.

2. The method of claim 1, where the multiple authorized user applications access the user credentials based on an open authorization key and secret.

3. The method of claim 1, where the multiple authorized user applications access the user credentials based on at least one of a secure sockets layer or transparent layer security.

4. The method of claim 1, where user name in the user credentials is also hashed.

5. The method of claim 1, where the authentication header includes user credentials that are valid only when they match user credentials already stored in the user's certain stored data in the data cloud.

6. The method of claim 5, where in response to the user credentials being valid, further comprising generating a cookie, and storing the cookie into the data cloud.

7. The method of claim 6, where the cookie is available only for a single user browsing session.

8. The method of claim 7, where the cookie is comprised of a single sign on token.

9. The method of claim 1, performed as a result of execution of computer program instructions stored in a computer-readable storage medium.

10. An apparatus, comprising:
a processor; and
a non-transitory memory including computer program code, where the memory and computer program code are configured to, with the processor, cause the apparatus at least to perform:
sending a client request for stored data into a data cloud in response to a need to access for a user certain stored data that requires authentication to gain access thereto, said data cloud being a collection of resources maintained to provide geographically distributed data storage for the data, where the client request does not provide a user name and password such that the client request does not identify the user;
receiving, from the data cloud, response information including at least an authentication realm, wherein the authentication realm corresponds to said geographically distributed data storage, and wherein the response information includes information identifying an authentication computer or system in the data cloud to be accessed for authentication with the authentication realm;
presenting the response information of the authentication realm to the user and prompting the user for a user name and password; and
re-sending the same client request into the data cloud with an authentication header having user credentials generated at least in part using the response information, the user credentials comprising the user name and a hashed password, the hashed password formed using a function included with the response information,
wherein the user credentials are stored in the data cloud as a <key, value> pair allowing multiple authorized user applications access to the user credentials, and wherein the key comprises a combination of the user name and the hashed password and the value comprises information descriptive of how many times the data has been accessed during some interval of time.

11. The apparatus of claim 10, where the multiple authorized user applications to access the user credentials based on an open authorization key and secret.

12. The apparatus of claim 10, where the multiple authorized user applications to access the user credentials based on at least one of a secure sockets layer or transparent layer security.

13. The apparatus of claim 10, where user name in the user credentials is also hashed.

14. The apparatus of claim 10, where the authentication header includes user credentials that are valid only when they match user credentials already stored in the user's certain stored data in the data cloud.

15. The apparatus of claim 14, where in response to the user credentials being valid, further comprising generating a cookie, and storing the cookie into the data cloud.

16. The apparatus of claim 15, where the cookie is available only for a single user browsing session.

17. The apparatus of claim 16, where the cookie is comprised of a single sign on token.

18. A non-transitory computer readable medium comprising computer program code stored thereon, the non-transitory computer readable medium and computer program code being configured to, when run on at least one processor, cause the apparatus to perform at least the following:
sending a client request for stored data into a data cloud in response to a need to access for a user certain stored data that requires authentication to gain access thereto, where the client request does not provide a user name and password such that the client request does not identify the user, said data cloud being a collection of resources maintained to provide geographically distributed data storage for the data;
receiving, from the data cloud, response information including at least an authentication realm, wherein the authentication realm corresponds to said geographically distributed data storage, and wherein the response information includes information identifying an authentication computer or system in the data cloud to be accessed for authentication with the authentication realm;
presenting the response information of the authentication realm to the user and prompting the user for a user name and password;
re-sending the same client request into the data cloud with an authentication header having user credentials generated at least in part using the response information, the user credentials comprising the user name and a hashed password, the hashed password formed using a function included with the response information, wherein the user credentials are stored in the data cloud as a <key, value> pair allowing multiple authorized user applications access to the user credentials, and wherein the key comprises a combination of the user name and the hashed password and the value comprises information descriptive of how many times the data has been accessed during some interval of time.

19. The non-transitory computer readable medium of claim 18, wherein the multiple authorized user applications access the user credentials based on at least one of: an open authorization key and secret; a secure sockets layer; or a transparent layer security.

* * * * *